Sept. 20, 1971  J. R. ERWIN ET AL  3,605,386
FURNACE EXHAUST POLLUTION ELIMINATOR
Filed June 16, 1970  2 Sheets-Sheet 1

INVENTORS
JIMMY R. ERWIN
ROBERT L. JUSTICE
EDWARD R. LOCKHART

BY J. Gibson Semmes
ATTORNEYS 3,605,386
FURNACE EXHAUST POLLUTION ELIMINATOR
Jimmy R. Erwin, Catlattsburg, and Edward Ray Lockhart and Robert Lee Justice, Ashland, Ky., assignors to Air Pollution Research & Developing Corporation, West Ashland, Ky.
Filed June 16, 1970, Ser. No. 46,781
Int. Cl. B01d 47/02, 47/06
U.S. Cl. 55—228                                        5 Claims

ABSTRACT OF THE DISCLOSURE

This furnace exhaust pollution eliminator is adapted to integral construction with a chimney stack or to installation between the respective input and exhaust ends thereof. The specific means include plural baffles confining the exhaust to ensure a saturation of the exhaust solids initially with steam and sequentially with cold water to effect oxidation and reduction of certain of the solids and the ultimate condensation of the steam for drainage, while ensuring unimpeded flow of the gases of combustion, less solids from the furnace stack or chimney. It is possible with this system to substantially decrease the common vertical dimension of exhaust stacks serving reaction plants, foundries, iron and steel mills and the like.

BACKGROUND OF THE INVENTION (1) Field of the invention

The specific means for accomplishing air pollution elimination herein encompass existing furnace stack systems; modified furnace stack systems; systems in which the exhaust stack comprises the eliminator per se as the integral component thereof. Additionally, the system is useful in most any type of industrial gaseous waste disposal through the exhaust thereof into the atmosphere. Whereas, it is specifically described as adapted to commercial systems, it would be of equal value and equally adapted to domestic heating units, as for example, condominiums and even single residences. It is useful in either chemical gaseous waste disposal or mineral waste disposal, wherein any products of reaction or combustion are normally exhausted to the atmosphere, polluting same.

(2) Description of the prior art

The known prior art involves complex adaptations to existing stacks or chimneys such as the Supressor for Solid Particles and Fumes patended by R. C. Ortgies No. 2,653,674, issued Sept. 29, 1953; and the other related systems such as that of G. F. De Ritter et al., Pat. 2,218,281 entitled Method for Cooling Flue Gas issued Oct. 15, 1940.

SUMMARY OF THE INVENTION

An apparatus for substantially complete removal of solids from gaseous waste exhaust in commercial and related heating systems including the entrainment thereof by fluid means, yielding to the air a pollution-free gas, the substantial portion of solids of said gases of reaction or combustion being entrained hydraulically, for reconstitution and reuse as combustibles or chemical solids.

DESCRIPTION OF THE PREFERRED EMBODIMENTS

Figures 1, 3:
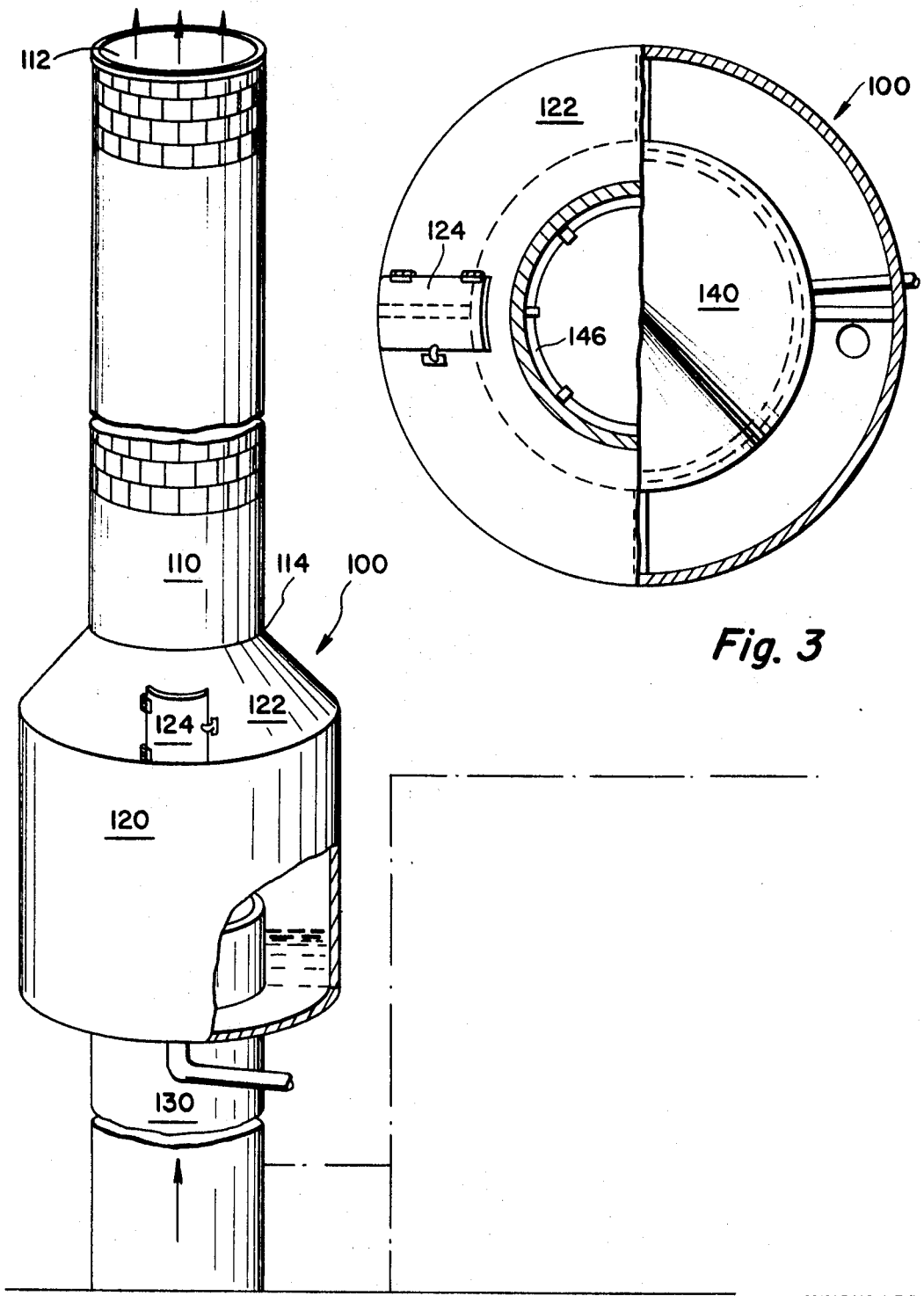
FIG. 1 is a view in perspective of the invention, a portion thereof being broken away.
FIG. 3 is a view in horizontal cross-section of the invention taken along the lines 3—3 of FIG. 2.
Figure 2:
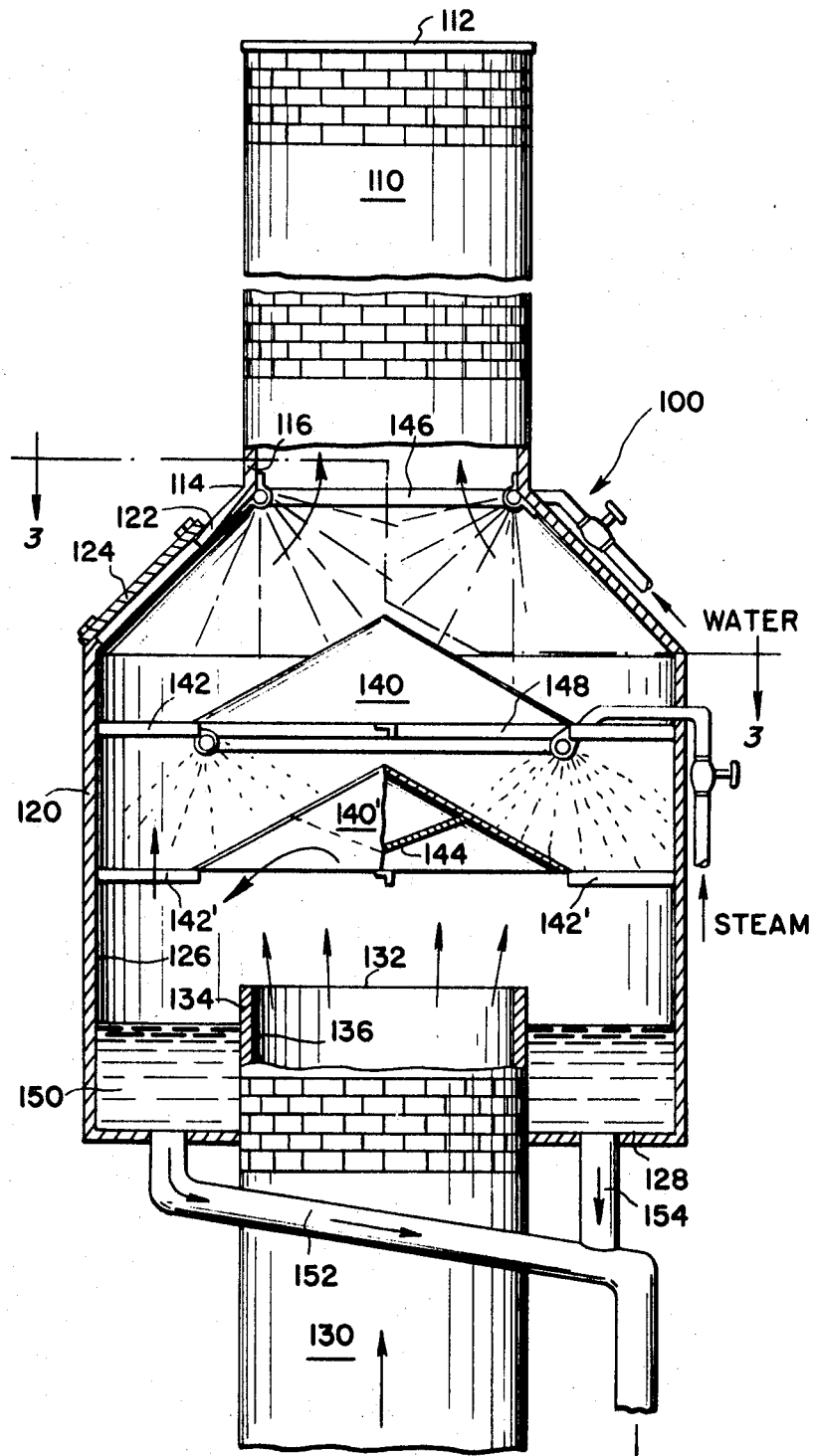
FIG. 2 is a view in vertical cross-section of the invention taken along the lines 2—2 of FIG. 1.

With reference to FIG. 1, the waste solids eliminator 100 is represented as having an exhaust stack, comprising a lower (in some cases intermediate) portion 120 which is of expanded cross-section with respect to the upper portion 110 thereof. The exhaust stack 110 includes outlet 112 and junction 114 as indicated, reference FIG. 2. The interior wall of the exhaust stack is represented by 116. From the junction 114 of the upper portion of the stack there is formed a converging flue portion 122 as the uppermost portion or frusto-conical roof of the cylinder 120, said cylinder 120 and conical extension thereof including access man-hole 124 and interior wall 126, terminating at a bottom 128, said bottom being apertured to receive the lowermost portion of the stack assembly 130 in sealed relation, said lowermost portion 130 extending upwardly into the interior of the chamber 120 sufficiently to form with the bottom thereof a reservoir for fluids and solids condensed from the system hereinafter described.

Plural baffles 140 and 140' are spaced vertically in axial alignment with the stack 100, the respective baffles being supported by peripherally spaced apart spanners 142 and 142', as shown. The lowermost of the baffles 140' includes an inverted conical deflector, disposed in reverse position with respect to the inverted baffle 140'. The purpose of this conic deflector is to ensure a substantially uniform disposition of the exhaust fumes from the furnace outwardly and peripherally of the baffle 140' to ensure full saturation with the steam injected from the annular header 148, said header incluing multiple apertures to dispense the steam under pressure into the exhaust effluent, whereby to saturate the solid particles thereof. The header 146 is adapted to ensure a cooling of the superposed baffle 140 and a condensation of the steam thereunder, following saturation of said steam of said exhaust fumes whereby to cause through gravity the deposition of the fluids and solids in the reservoir 150 for gravity feed conduction out of the system, via the conduits 152 and 154.

The baffles are preferably formed of stainless steel and are rolled and cone shaped. Within the reservoir suitable means for overflow control may be adapted, as for example, a float valve and alarm switch or other means of controlling to shut off the air pollution eliminator system, entirely and permit a more free unsaturated flow of the products of combustion or reaction from the system. Referring again to the baffles, their size and relationship to the input portion of the stack and the output portion thereof which are of substantially the same dimension in horizontal cross section and whereas the intermediate portion is of expanded horizontal cross section with respect to said input and exhaust portions, the baffles disposed in the intermediate portion 120, exeed in horizontal dimension the respective cross sections of the input and exhaust portions of the stack. Moreover, it will be noted that the respective steam and water headers 148 and 146 vary in circumference, the water header having a circumference which corresponds in cross-sectional dimension to the exhaust portion of the stack, whereas the steam header is of increased circumference with respect to the input and/or exhaust portions of the stack, all as indicated in the drawings.

The device may further be described as a gaseous waste solid eliminator having as an integral portion an exhaust stack wherein the stack defines a lower input portion 130 and an upper outlet portions 110. The eliminator indicated generally by reference numeral 100 has an intermediate collector comprising wall 120, frusto-conical roof 122, and bottom wall 128. Therefore the collector is of expanded cross section with respect to the upper outlet portion 110 of the stack. The frusto-conical roof 122 connects the collector to the stack at 114. The collector contains plural baffles 140 and 140' which baffles are disposed in axially aligned relationship to one another and in the path of exhaust passing through the collector. There is at least an uppermost baffle element 140 and a lowermost baffle element 140'. The baffle element 140 is in the form of an inverted cone. The lowermost baffle element 140' likewise is in the form of an inverted cone. The lowermost baffle element 140' has at it interior center an element 144 which defines a reverse concentric section with baffle element 140'. An annular steam injection means 148 is interposed between the respective baffles 140 and 140' for directing steam toward the stack input portion 130 in counterflow to the exhaust thereof. The steam injection means including plural exhaust port means operatively constructed and arranged for substantially filling the entire cross-section of the lower portion of the collector with a curtain of steam for saturating the solids. The steam injection means 148 is disposed in operative connection with and supported by the uppermost baffle element 140 substantially annularly thereof. An annular hydralic means 146 is disposed in concentric relation to the interior of the upper outlet portion 110 of the stack. Hydraulic means 146 has divergent outlet means downwardly and inwardly projected for injecting water under pressure for substantially filling the cross-section of the collector above the baffles 140 and 140' with water spray. The hydraulic means is operatively constructed and arranged for carrying the steam saturated solids and steam combination and condensing said steam for deposition at the base of the collector in deposition reservoir means 150. The deposition reservoir means 150 is defined between and by the lower input portion 130 of the stack and the lower portion of the collector, that is element 128 and the lower portion of wall 120. The reservoir 150 receives the depositions at the base of the collector for reconstitution. The elements 152 and 154 are a means at the base of the eliminator externally of the lower portion of the reservoir means 150 for removing the depositions from the reservoir means 150 for reconstitution.

In operation, pollutant solids emanating from gaseous waste of reaction and/or combustion gases confinedly flow into a curtain of injected steam to saturate the gases and solids thereof; thereafter the saturated gases and solids are subjected to a water bath to condense the said gases, and the resultant pollutant effluent is collected while simultaneously and unimpededly exhausting a substantially solid-free gas of reaction and combustion to the atmosphere. The objectives of invention will be apparent from a study of the foregoing, and the following claims.

We claim:

1. A gaseous waste solid eliminator having as an integral portion an exhaust stack wherein the stack defines lower input and upper outlet portions of said eliminator, said eliminator comprising:

(A) an intermediate collector operatively associated with said stack, said collector being of expanded cross-section with respect to the lower input and the upper outlet portion of said stack, the collector having a frusto-conical roof, said roof connecting the collector to the upper outlet portion of the stack;

(B) plural baffles within the collector, said baffles being disposed in axially aligned relationship to one another and in the path of exhaust passing through said collector, said baffles being spaced apart from the interior surface of the collector wall, said baffles comprising uppermost and lowermost elements, the uppermost elements defining an inverted cone, the walls of which are in complemental disposition relato to the stack collector roof; the lowermost element likewise defining an inverted cone, the interior center of which defines a reverse concentric section with the inverted cone;

(C) annular steam injection means interposed between the respective baffles for directing steam toward the stack input portion in counterflow to the exhaust thereof; said steam injection means including plural exhaust port means for said steam operatively constructed and arranged for substantially filling the entire cross-section of the lower portion of the collector with a curtain of steam for saturating the solids, said steam injection means being disposed in operative connection with and supported by the uppermost baffle element substantially annularly thereof;

(D) annular hydraulic means disposed in concentric relation to the interior of said upper outlet portion of said stack and having divergent outlet means downwardly and inwardly projected for injecting water under pressure for substantially filling the cross-section of the collector above said baffles with water spray, said hydraulic means being operatively constructed and arranged for carrying the steam saturated solids and steam combination and condensing said steam for deposition at the base of said collector;

(E) deposition reservoir means defined between and by said lower input portion of said stack and the lower portion of said collector for receiving said depositions at the base of said collector for reconstitution; and (F) means at the base of said eliminator externally of the lower portion of said reservoir means for removing said depositions from said reservoir for reconstitution.

2. The eliminator of claim 1 wherein said frusto-conical roof includes at least one access man-hole having a cover disposed in closing relationship therewith.

3. The eliminator of claim 1 wherein said baffles are supported within said collector by a plurality of radially extending spanners.

4. The eliminator of claim 1 wherein said baffles are formed of stainless steel.

5. The eliminator of claim 1 wherein said annular hydraulic means has a smaller circumference than does said annular steam injection means.

References Cited

UNITED STATES PATENTS

| | | | |
|---|---|---|---|
| 809,383 | 1/1906 | Lowe | 55—263X |
| 943,422 | 12/1909 | Knoepfel. | |
| 1,009,963 | 11/1911 | Gamblin | 261—111X |
| 1,291,840 | 1/1919 | Gran | 261—116X |
| 1,563,125 | 11/1925 | Ward | 55—263X |
| 2,186,125 | 1/1940 | Roberts | 55—263X |
| 2,387,345 | 10/1945 | Pearl | 261—126 |
| 2,529,045 | 11/1950 | Ortgies | 261—126X |
| 2,643,105 | 6/1953 | Lipowitz | 261—115 |

(Other references on following page)

| UNITED STATES PATENTS | | | |
|---|---|---|---|
| 2,643,867 | 6/1953 | Schneible et al. | 261—126 |
| 2,646,263 | 7/1953 | Goldberg | 110—119X |
| 2,736,541 | 2/1956 | Maiman | 261—126 |
| 3,045,990 | 7/1962 | Keenan, Jr. | 261—120 |
| 3,131,237 | 4/1964 | Collins, Jr. | 261—153 |
| 3,432,153 | 3/1969 | Drum | 261—108 |
| 3,487,620 | 1/1970 | Klein et al. | 55—222 |
| 3,494,099 | 2/1970 | Eng et al. | 55—15X |
| 3,495,384 | 2/1970 | Alliger | 55—233 |

FOREIGN PATENTS

| 25,954 | 1910 | Great Britain | 55—263 |
|---|---|---|---|
| 575,293 | 4/1958 | Italy | 110—119 |

DENNIS E. TALBERT, Jr., Primary Examiner

U.S. Cl. X.R.

21—56, 61; 23—2R; 55—227, 229, 260, 263, 264, 418, 431, 463, 478, Dig. 20; 75—.5; 98—30, 58; 110—119, 150, 184; 261—2, 17, 19, 111, 117, 118, 126, Dig. 9; 266—15